United States Patent [19]

Miyahara et al.

[11] Patent Number: 5,147,712
[45] Date of Patent: Sep. 15, 1992

[54] NON-WOVEN FABRIC

[75] Inventors: Yoshiki Miyahara, Uji; Satoshi Kasetani, Nara; Shigetaka Nishimura, Uji, Japan; Kunihiro Hirsoe, Kawasaki; Takashi Inoue, Yokosuka; Takashi Nogi, Kyoto, all of Japan

[73] Assignee: Nippon Unicar Company Limited, Danbury, Conn.

[21] Appl. No.: 750,303

[22] Filed: Aug. 27, 1991

[51] Int. Cl.⁵ .................... D04H 1/04; B32B 5/22; C08L 67/07

[52] U.S. Cl. .................... 428/224; 428/296; 428/288; 525/185; 525/186

[58] Field of Search ............ 428/296, 297, 224, 302, 428/339; 525/185, 186

[56] References Cited

U.S. PATENT DOCUMENTS

| | | | |
|---|---|---|---|
| 2,940,869 | 6/1960 | Graham | 525/186 |
| 3,632,687 | 1/1972 | Walter et al. | 525/186 |
| 3,734,979 | 5/1973 | Koleske et al. | 525/186 |
| 3,852,913 | 12/1974 | Clendinning et al. | 47/37 |
| 3,867,324 | 2/1975 | Clendinning et al. | 260/23 H |
| 4,709,808 | 12/1987 | Balduff et al. | 525/185 |
| 4,880,691 | 11/1989 | Sawyer et al. | 428/296 |
| 4,909,975 | 3/1990 | Sawyer et al. | 428/296 |

*Primary Examiner*—George F. Lesmes
*Assistant Examiner*—Kathryne E. Shelborne
*Attorney, Agent, or Firm*—Saul R. Bresch

[57] ABSTRACT

A non-woven fabric, the fibers of which are comprised of:
(i) polyethylene;
(ii) polycaprolactone; and, optionally,
(iii) a copolymer of ethylene and carbon monoxide and, optionally, one or more ethylenically unsaturated monomeric organic compounds having 3 or more carbon atoms wherein ethylene is present in major proportion, by weight, and carbon monoxide is present in an amount of about 1.5 to about 7 percent by weight, all based on the weight of the copolymer.

19 Claims, No Drawings

NON-WOVEN FABRIC

TECHNICAL FIELD

This invention relates to non-woven fabrics, which are biodegradable and/or photo-degradable.

BACKGROUND INFORMATION

Non-woven fabrics are used in sanitary goods such as disposable diapers and sanitary napkins, packaging materials for consumer and industrial products, and protective clothing. They are usually made from fibers of polyethylene, polypropylene, polyester, or polyamide. Non-woven fabrics made of these fibers are chemically stable under ordinary environmental conditions and, therefore, are usually disposed of by incineration or utilized as landfill. In Japan, incineration is expensive and, with regard to landfill, the chemically stable non-woven fabrics remain intact for long periods of time.

There is a demand for non-woven fabrics, which naturally decompose in a short period of time. This demand cannot be met with conventional biodegradable fibers such as cellulose and protein fibers, which are generally too expensive to be used as disposable non-woven fabrics, and cannot be made into non-woven fabrics by the thermal bond process because they are not thermoplastic. There are biodegradable, thermoplastic resins, but, again, they are generally too expensive for use in disposable non-woven fabrics, or they are not suitable for such applications.

DISCLOSURE OF THE INVENTION

An object of this invention, therefore, is to provide an inexpensive, biodegradable, thermoplastic non-woven fabric. Other objects and advantages will become apparent hereinafter.

According to the present invention, the above object is met by the provision of non-woven fabric, the fibers of which are comprised of:
 (i) polyethylene;
 (ii) polycaprolactone; and optionally,
 (iii) a copolymer of ethylene and carbon monoxide and, optionally, one or more ethylenically unsaturated monomeric organic compounds having 3 or more carbon atoms, wherein the carbon monoxide is present in the copolymer in an amount of about 1.5 to about 7 percent by weight and the ethylene is present in the copolymer in major proportion, by weight, all based on the weight of the copolymer.

DESCRIPTION OF THE PREFERRED EMBODIMENT(S)

The polyethylene, which can be used in subject invention, includes high density polyethylene, medium density polyethylene, low density polyethylene, and linear low density Polyethylene. The density can range from about 0.91 to about 0.97 gram per cubic centimeter. Densities higher than 0.94 gram per cubic centimeter and melt indices lower than about 45 grams per 10 minutes, preferably lower than 10 grams per 10 minutes, and most preferably lower than 1 gram per 10 minutes, are Preferred properties of the polyethylene utilized. The melt indices are measured according to ASTM D-1238, Condition E. The polyethylene can be a homopolymer of ethylene or a copolymer of ethylene and one or more alpha-olefins having 3 to 12 carbon atoms such as propylene, 1-butene, 1-hexene, 4-methyl-1-pentene, and 1-octene. It can be prepared by the processes described in U.S. Pat. Nos. 4,303,771 and 4,508,842.

The polycaprolactone can be a thermoplastic crystalline polyester having a melting point of about 60° C. It is obtained by the ring opening polymerization of epsilon-caprolactone and can have a molecular weight in the range of about 10,000 to about 100,000. The molecular weight of the Polycaprolactone is preferably in the range of about 20,000 to about 50,000.

The copolymer of ethylene and carbon monoxide, and, optionally, one or more ethylenically unsaturated monomeric organic compounds can contain a major proportion of ethylene, i.e., at least about 50 percent by weight based on the weight of the copolymer. Preferably, ethylene is present in an amount of about 65 to about 90 percent by weight. In any case, the balance of the copolymer is made up of ethylene. The carbon monoxide can be present in an amount of about 1.5 to about 7 percent by weight based on the weight of the copolymer, preferably about 2 to about 4 percent by weight. The ethylenically unsaturated monomeric organic compound, if present in the copolymer, can be included in amounts of about 1 to about 30 percent by weight, preferably about 5 to about 15 percent by weight, based on the weight of the copolymer.

The ethylenically unsaturated monomeric organic compound can have 3 to 10 carbon atoms and is exemplified by vinyl acetate, ethyl acrylate, vinyl butyrate, methacrylic acid, methyl methacrylate, ethyl methacrylate, butyl methacrylate, maleic acid, fumaric acid, acrylonitrile, acrylamide, vinyl methyl ether, vinyl phenyl ether, styrene, vinyl chloride, propylene, butene-1, hexene-1, octene-1, decene-1, and 4-methylpentene-1. Vinyl esters and unsaturated carboxylic acid esters are preferred as a class. Vinyl acetate and ethyl acrylate are preferable from the standpoint of production cost, mechanical properties and heat resistance. While the compound can have more than one double bond, one double bond is preferred.

The ethylene/carbon monoxide copolymer can be made by the processes disclosed in the following U.S. Pat. Nos.:

2,497,323
2,641,590
3,083,184
3,248,359
3,530,109
3,676,401
3,689,460
3,694,412
3,780,140
3,835,123
3,929,727
3,048,832
3,948,850
3,948,873
3,968,082
3,984,388
4,024,104
4,024,325
4,024,326
4,076,911
4,143,096
4,137,382
4,139,522
4,304,887

To be more specific, the ethylene/carbon monoxide can be produced using one of the following techniques:

(1) The copolymerization is carried out in a reactor at a temperature in the range of about 150° C. to about 300° C. under a pressure of about 500 to about 3000 atmospheres using a free radical generator such as dilauroyl peroxide, tert-butyl peroxide, tert-butyl perisobutyrate, tert-butyl peracetate, or alpha, alpha'-azobisisobutyronitrile. The free radical generator is dissolved in an inert organic solvent such as benzene, kerosene, or mineral oil before introduction into the reactor.

(2) The copolymerization is carried out in a reactor using slurry, solution, or gas phase techniques at a temperature in the range of about 50° C. to about 300° C. under a pressure of 1 to 200 atmospheres in the presence of a Ziegler-Natta or Phillips type catalyst.

The polyethylene can be present in an amount of about 20 to about 97 percent by weight and is preferably present in an amount of about 30 to about 60 percent by weight based on the combined weight of the polyethylene, the polycaprolactone, and the copolymer of ethylene and carbon monoxide, if present. In any event, the polyethylene makes up the balance of 100 percent by weight of the three components. The polycaprolactone can be present in an amount of about 3 to about 30 percent by weight and is preferably present in an amount of about 10 to about 20 percent by weight. The copolymer of ethylene and carbon monoxide, if used, can be present in an amount of about 20 to about 50 percent by weight and is preferably present, again if used, in an amount of about 30 to about 40 percent by weight.

The fibers of the non-woven fabric preferably have a single yarn fineness smaller than 5 denier, and most preferably smaller than 3 denier. Where the three components are used together in the fiber, the non-woven fabric has a three dimensional network structure.

To prepare the fibers, the components can be mixed before or at the time of spinning. In the former case, which is preferable, the components are mixed to form master chips using a twin-screen or triple-screen extruder. In the latter case, the components are mixed in the form of chips or melt.

The fiber can be produced by the flash spinning process which involves the discharging of a polymer solution from a high temperature, high pressure zone into a low temperature, low pressure zone thereby flashing the solvent. The fiber can then be made into a non-woven fabric in sheet form by known processes.

The non-woven fabric can also be produced by first mixing the components. Then, the mixture is spun into filaments using a melt spinning machine at a melt temperature in the range of about 210° C. to about 280° C. The filaments are cooled and solidified, and collected on a moving endless wire net to form a web. Finally, the web undergoes heat bonding by a hot flat roll or embossing roll. The cooled and solidified filaments can be stretched before being made into a web. In this case, filament stretching and web making can be carried out continuously or separately. An alternative method of forming a web is by the carding of fibers made from the stretched filaments. Another alternative method of forming a web is by a wet papermaking process from uncrimped fibers. The filaments can have not only a round section, but also an odd-shaped section having hollow, flat, and Y-shapes.

The composition can contain additives such as pigments, crosslinking agents, slip agents, processing aids, anti-static agents, nucleating agents, anti-fogging agents, flame retardants, bactericides, deodorants, perfumes, and preservatives in amounts which do not lower heat resistance or inhibit biodegradability and photo-degradability. The composition can also contain other polymers such as ethylene/vinyl acetate copolymers, ethylene/ethyl acrylate copolymers, and ionomers, and oxidation accelerators with the same caveat.

The advantages of the non-woven fabric prepared from the composition described above and the articles made from the non-woven fabric are a high level of heat resistance and biodegradability, and, where the copolymer of ethylene and carbon monoxide is present, a high level of photo-degradability, all with high strength, surface smoothness, heatability, and opaqueness.

The patents mentioned in this specification are incorporated by reference herein.

The invention is illustrated by the following examples.

EXAMPLES 1 to 6

The tensile strength of the non-woven fabric is measured according to JIS (Japanese Industrial Standards) L 1096 (strip method) with a test piece measuring 3 centimeters wide and 10 centimeters long.

Compositions are prepared from polycaprolactone having an average molecular weight of about 40,000 and linear low density polyethylene (LLDPE) containing 5 percent by weight 1-octene and having a density of 0.937 gram per cubic centimeter, a melting point of 125° C., and a melt index of 25 grams per 10 minutes measured according to ASTM D-1238, Condition E, by mixing in a twin-screen extruder. Each composition is made into master chips. The content of polycaprolactone in the mixture is 3 percent by weight in Example 1; 10 percent by weight in Example 2; 20 percent by weight in Example 3; 30 percent by weight in Example 4; 1 percent by weight in Example 5; and 35 percent by weight in Example 6, the balance in all examples being LLDPE.

The master chips are extruded into multifilaments at a spinning temperature of 230° C. to 250° C. through spinnerets, each having 64 holes, 0.35 millimeter in diameter, at a throughput of 1.2 gram per minute per hole. The filaments are taken up continuously at a rate of 3500 meters per minute by means of a vacuum installed 120 centimeters below the spinneret. The filaments are collected on a moving endless wire net and then formed into a web. The web is passed through metal embossing rolls and metal flat rolls for compression at a linear pressure of 30 kilograms per centimeter and a press-contact area ratio of 20 percent, and then for heat treatment at 105° C. Thus, there is obtained a spunbond non-woven fabric having a basis weight of 20 grams per square centimeter comprised of filaments having a single yarn fineness of 3 denier. The non-woven fabric has the properties shown in Table I.

The biodegradability of the web is rated according to whether (poor) or not (good) the non-woven fabric retains its original shape, or whether (good) or not (poor) the non-woven fabric loses more than 50 percent of its initial tensile strength even though it retains its original shape, after it has been buried in the soil at 10° C. to 25° C. for 6 months. These criteria do not apply to non-woven fabric, which has an initial tensile strength lower than 800 grams per cubic centimeter. In this case, the non-woven fabric is given an overall rating of "poor".

TABLE I

| Example | Polycaprolactone (wt %) | Initial tensile strength of non-woven fabric (g/cu cm) | Biodegradability | Overall rating |
| --- | --- | --- | --- | --- |
| 1 | 3 | 1100 | good | good |
| 2 | 10 | 1020 | good | good |
| 3 | 20 | 910 | good | good |
| 4 | 30 | 880 | good | good |
| 5 | 1 | 1120 | poor | good |
| 6 | 35 | 670 | good | poor |

EXAMPLES 7 to 30

The properties of the samples are evaluated by the following methods:

(i) Tensile strength of non-woven fabric: expressed in terms of the maximum tensile strength measured according to JIS L 1046 with a sample measuring 30 millimeters wide and 100 millimeters long.

(ii) Self-degradability: a sample is rated as good if it passes both the photo-degradation test and the biodegradation test.

(iii) Photo-degradation test: evaluated according to the tensile strength of the sample which is retained after irradation at 63° C. for 40 hours in simulated sunshine. The sample is rated good if it retains 60 to 90 percent of the initial tensile strength.

(iv) Biodegradability: evaluated by observing the sample which is buried in soil at 10° C. to 25° C. for 6 months. The sample is rated good if it loses its original shape after being buried. The sample is also rated good, even though it retains its original shape, if it loses more than 50 percent of the original tensile strength.

A resin composition in the form of master chips is prepared from an ethylene/carbon monoxide copolymer containing 1.5 to 7 percent by weight carbon monoxide; polycaprolactone having an average molecular weight of about 40,000; and polyethylene having a melt index of about 1.0 gram per 10 minutes by mixing in a twin-screen extruder.

The master chips are made into a non-woven fabric having a basis weight of 40 grams per square meter by flash spinning. The flash spinning is carried out at a solution temperature of 200° C. and a solution concentration of 14 percent by weight, the solution being supplied from a 10 liter autoclave, equipped with a stirrer and a pressurizing inert gas inlet, containing the master chips and methylene chloride solvent. The resulting non-woven fabric is rated as good if it has a tensile strength higher than 2 kilograms per cubic centimeter, and is rated as poor if it has a tensile strength lower than 2 kilograms per cubic centimeter.

The variables and results are set forth in Table II.

TABLE II

| Example No. | CO (wt %) | Composition (wt %) | | | Tensile Strength (maximum) | Photo-degradation | Bio-degradation | Overall evaluation |
| --- | --- | --- | --- | --- | --- | --- | --- | --- |
| | | X | Y | Z | | | | |
| 7 | 2.7 | 20 | 3 | 77 | good | good | good | good |
| 8 | 2.7 | 20 | 15 | 65 | good | good | good | good |
| 9 | 2.7 | 20 | 30 | 50 | good | good | good | good |
| 10 | 2.7 | 35 | 3 | 62 | good | good | good | good |
| 11 | 2.7 | 35 | 15 | 50 | good | good | good | good |
| 12 | 2.7 | 35 | 30 | 35 | good | good | good | good |
| 13 | 2.7 | 50 | 3 | 47 | good | good | good | good |
| 14 | 2.7 | 50 | 15 | 35 | good | good | good | good |
| 15 | 2.7 | 50 | 30 | 20 | good | good | good | good |
| 16 | 1.5 | 20 | 3 | 77 | good | good | good | good |
| 17 | 1.5 | 20 | 30 | 50 | good | good | good | good |
| 18 | 1.5 | 50 | 3 | 47 | good | good | good | good |
| 19 | 1.5 | 50 | 30 | 20 | good | good | good | good |
| 20 | 7.0 | 20 | 3 | 77 | good | good | good | good |
| 21 | 7.0 | 20 | 30 | 50 | good | good | good | good |
| 22 | 7.0 | 50 | 3 | 47 | good | good | good | good |
| 23 | 7.0 | 50 | 30 | 20 | good | good | good | good |
| 24 | 2.7 | 15 | 3 | 82 | good | poor | good | poor |
| 25 | 2.7 | 15 | 30 | 55 | good | poor | good | poor |
| 26 | 2.7 | 55 | 3 | 42 | poor | good | good | good |
| 27 | 2.7 | 55 | 30 | 15 | poor | good | good | poor |
| 28 | 2.7 | 35 | 1 | 64 | good | good | poor | poor |
| 29 | 2.7 | 30 | 35 | 35 | poor | good | good | poor |

Notes to Tables II and III

1. CO (wt%) is the amount of carbon monoxide in the ethylene/carbon monoxide copolymer in percent by weight based on the weight of the copolymer.

2. X = the percent by weight of ethylene/carbon monoxide copolymer based on the weight of the three components (X, Y, and Z) of the composition.

3. Y = the percent by weight of polycaprolactone based on the weight of the three components (X, Y, and Z) of the composition.

4. Z = the percent by weight polyethylene based on the weight of the three components (X, Y, and Z) of the composition.

5. Tensile strength is the maximum tensile strength referred to above with respect to methods of evaluation. See method (i).

6. Photodegradation: see method (iii).

7. Biodegradation: see method (iv).

8. Overall evaluation:
good = satisfies the following three conditions:
  (i) tensile strength $\geq$ 800 g/cc
  (ii) photodegradation = good
  (iii) biodegradation = good
poor = lacks at least one of the above conditions.

EXAMPLES 30 to 37

Examples 20 is repeated except that the ethylene/carbon monoxide copolymer is a terpolymer which include a vinyl acetate monomer in examples 30 to 33 and an ethyl acrylate monomer in examples 34 to 37.

Variables and results are set forth in Table III.

TABLE III

| Example No. | CO (wt %) | Composition (wt %) | | | Tensile Strength (maximum) | Photo-degradation | Bio-degradation | Overall evaluation |
| --- | --- | --- | --- | --- | --- | --- | --- | --- |
| | | X | Y | Z | | | | |
| 30 | 7.0 | 20 | 3 | 77 | good | good | good | good |
| 31 | 7.0 | 20 | 30 | 50 | good | good | good | good |
| 32 | 7.0 | 50 | 3 | 47 | good | good | good | good |
| 33 | 7.0 | 50 | 30 | 20 | good | good | good | good |
| 34 | 7.0 | 20 | 3 | 77 | good | good | good | good |
| 35 | 7.0 | 20 | 30 | 50 | good | good | good | good |
| 36 | 7.0 | 50 | 3 | 47 | good | good | good | good |
| 37 | 7.0 | 50 | 30 | 20 | good | good | good | good |

We claim:

1. A non-woven fabric, the fibers of which are comprised of a blend:
   (i) polyethylene;
   (ii) polycaprolactone; and, (iii) a copolymer of ethylene and carbon monoxide and, optionally, one or more ethylenically unsaturated monomeric organic compounds having 3 or more carbon atoms wherein ethylene is present in major proportion, by weight, and carbon monoxide is present in an amount of about 1.5 to about 7 percent by weight, all based on the weight of the copolymer.

2. The non-woven fabric defined in claim 1 wherein the polyethylene has a density in the range of about 0.91 to about 0.97 gram per cubic centimeter and a melt index of less than about 45 grams per 10 minutes.

3. The non-woven fabric defined in claim 2 wherein the polyethylene has a density in the range of about 0.94 to about 0.97 gram per cubic centimeter and a melt index of less than about 10 grams per 10 minutes.

4. The non-woven fabric defined in claim 1 wherein the polycaprolactone has a molecular weight in the range of about 10,000 to about 100,000.

5. The non-woven fabric defined in claim 4 wherein the polycaprolactone has a molecular weight in the range of about 20,000 to about 50,000.

6. The non-woven fabric defined in claim 1 wherein the carbon monoxide is present in the ethylene/carbon monoxide copolymer in an amount of about 2 to about 4 percent by weight based on the weight of the copolymer.

7. The non-woven fabric defined in claim 1 wherein ethylene makes up the balance, by weight, of the copolymer of component (iii).

8. The non-woven fabric defined in claim 1 wherein the ethylene is present in the copolymer of component (iii) in an amount of about 65 to about 90 percent by weight.

9. The non-woven fabric defined in claim 1 wherein the ethylenically unsaturated monomeric organic compound is present in the copolymer of component (iii) in an amount of about 1 to about 20 percent by weight.

10. The non-woven fabric defined in claim 9 wherein the ethylenically unsaturated monomeric organic compound is present in the copolymer of component (iii) in an amount of about 5 to about 15 percent by weight.

11. The non-woven fabric defined in claim 1 wherein each ethylenically unsaturated monomeric organic compound has 3 to 10 carbon atoms.

12. The non-woven fabric defined in claim 1 wherein the ethylenically unsaturated monomeric organic compound is a vinyl ester or an unsaturated carboxylic acid ester.

13. The non-woven fabric defined in claim wherein the ethylenically unsaturated monomeric organic compound is vinyl acetate or ethyl acrylate.

14. The non-woven fabric defined in claim 1 wherein the components are present in about the following amounts:

| Components | Percent by weight |
|---|---|
| polyethylene | 20 to 97 |
| polycaprolactone | 3 to 30 |
| ethylene/CO copolymer | 20 to 50 |

15. The non-woven fabric defined in claim 14 wherein the components are present in about the following amount:

| Components | Percent by weight |
|---|---|
| polyethylene | 30 to 60 |
| polycaprolactone | 10 to 20 |
| ethylene/CO copolymer | 30 to 40 |

16. The non-woven fabric defined in claim 1 wherein the fibers have a single yarn fineness of less than about 5 denier.

17. The non-woven fabric defined in claim 1 wherein the fibers have a single yarn fineness of less than about 3 denier.

18. The non-woven fabric defined in claim 14 wherein the fabric has a three dimensional network structure.

19. A non-woven fabric, the fibers of which are comprised of a blend:
  (i) polyethylene having a density in the range of about 0.94 to about 0.97 gram per cubic centimeter and a melt index of less than about 10 grams per 10 minutes in an amount of about 30 to about 60 percent by weight;
  (ii) polycaprolactone having a molecular weight in the range of about 20,000 to about 50,000 in an amount of about 10 to about 20 percent by weight; and,
  (iii) a copolymer of ethylene, carbon monoxide, and a vinyl ester or unsaturated carboxylic acid ester wherein the carbon monoxide is present in an amount of about 2 to about 4 percent by weight; the ester is present in an amount of about 5 to about 15 percent by weight; and the balance is ethylene, all based on the weight of the copolymer, said copolymer being present in an amount of about 30 to about 40 percent by weight,
  the percents by weight being based on the combined weight of components (i) and (ii), and component (iii).

* * * * *